United States Patent
Lee et al.

(10) Patent No.: US 7,349,039 B2
(45) Date of Patent: Mar. 25, 2008

(54) OPTICAL SHEET AND LCD APPARATUS USING THE SAME

(75) Inventors: Jeong-hwan Lee, Suwon-si (KR); Byung-woong Han, Incheon (KR); Jong-dae Park, Seoul (KR); Dong-hoon Kim, Suwon-si (KR); Ming-gyu Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/792,414

(22) Filed: Mar. 3, 2004

(65) Prior Publication Data
US 2005/0007513 A1  Jan. 13, 2005

(30) Foreign Application Priority Data
Mar. 5, 2003  (KR) .................. 10-2003-0013757

(51) Int. Cl.
 *G02F 1/1335* (2006.01)
(52) U.S. Cl. ........................................ 349/57; 349/62
(58) Field of Classification Search ........... 349/57, 349/62–64
See application file for complete search history.

(56) References Cited

U.S. PATENT DOCUMENTS

| | | | | |
|---|---|---|---|---|
| 5,995,288 | A * | 11/1999 | Kashima et al. | 359/599 |
| 6,025,958 | A * | 2/2000 | Yamaoka et al. | 359/494 |
| 6,784,959 | B2 * | 8/2004 | Noritake | 349/113 |
| 6,791,639 | B2 * | 9/2004 | Colgan et al. | 349/95 |
| 6,861,121 | B2 * | 3/2005 | Matsunaga et al. | 428/141 |
| 7,106,395 | B2 * | 9/2006 | Maeda | 349/65 |
| 2001/0036013 | A1 * | 11/2001 | Allen et al. | 359/599 |

FOREIGN PATENT DOCUMENTS

| | | |
|---|---|---|
| CN | 1311453 | 9/2001 |
| JP | 06265892 | 9/1994 |
| JP | 08297202 | 11/1996 |
| JP | 200089007 A * | 3/2000 |
| JP | 2001013321 | 1/2001 |
| JP | 2003048291 | 2/2003 |

OTHER PUBLICATIONS

Japanese Office action, May 22, 2007. All references cited in the Office action and not previously submitted are listed above.
Taiwanese Office Action; 93105693; Apr. 14, 2007.
All the references cited in the Foreign Office action, and not previously submitted, are listed above.

* cited by examiner

*Primary Examiner*—David Nelms
*Assistant Examiner*—Phu Vu
(74) *Attorney, Agent, or Firm*—Cantor Colburn LLP

(57) ABSTRACT

The present invention relates to an optical sheet and an LCD apparatus using the same. An LCD apparatus according to the present invention comprises an LCD panel to display a picture thereon; a lamp unit emitting light; a light guide plate to guide the light from the lamp unit toward the LCD panel evenly; an optical sheet provided between the LCD panel and the light guide plate and including a condensing layer condensing the light from the light guide plate on the LCD panel, and a reflective polarizing layer attached to the surface of the condensing layer facing the LCD panel and selectively transmitting and reflecting the light condensed by the condensing layer. With this configuration, the present invention provides an optical sheet and an LCD apparatus using the same, in which a bright-line is decreased, brightness are enhanced, and the optical sheet is prevented from shrinking.

6 Claims, 10 Drawing Sheets

FIG. 9
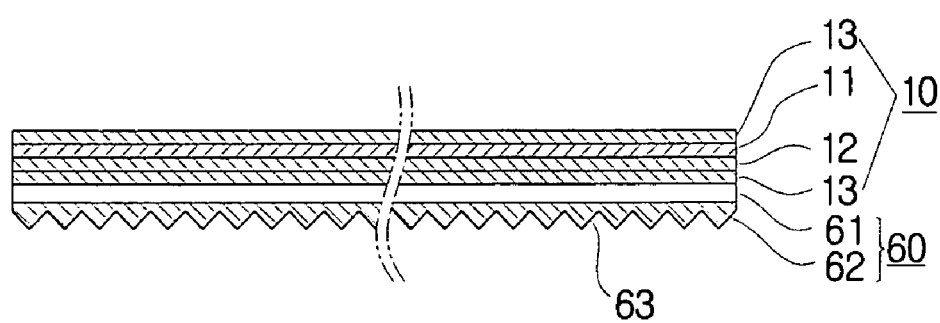
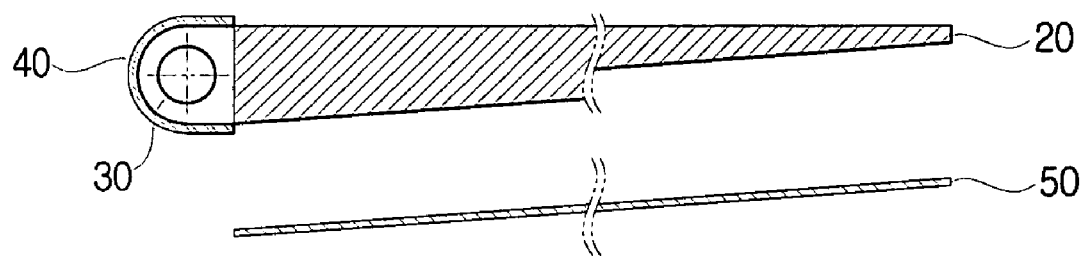

US 7,349,039 B2

OPTICAL SHEET AND LCD APPARATUS USING THE SAME

CROSS-REFERENCE TO RELATED APPLICATIONS

This application claims the benefit of Korean Patent Application No. 2003-013757, filed Mar. 5, 2003, in the Korean Intellectual Property Office, the disclosure of which is incorporated herein by reference.

BACKGROUND OF THE INVENTION

1. Field of the Invention

The present invention relates to an optical sheet and an LCD (liquid crystal display) apparatus using the same, and more particularly, to an LCD apparatus in which a bright-line is decreased, brightness are enhanced, and the optical sheet is prevented from shrinking.

2. Description of the Related Art

An LCD apparatus employs the principle that a molecular arrangement of liquid crystal is varied when voltage is applied to the liquid crystal. The varied molecular arrangement causes double refraction, optical rotatory power, optical scattering, etc., thereby forming visible images. In other words, the LCD device displays the images by controlling the intensity of light passing through the liquid crystal.

The LCD device needs a light source because the LCD device cannot emit light by itself. Therefore, a back light assembly is employed for lightening an LCD panel.

FIG. 1 is an exploded sectional view of the conventional LCD apparatus. As shown therein, the conventional LCD apparatus comprises an LCD panel 110 displaying the images thereon, and the back light assembly 200 provided behind the LCD panel 110 and lightening the LCD panel 110.

The back light assembly 200 comprises a lamp unit 130 used as the light source, a light guide plate 120 guiding the light from the lamp unit 130 uniformly, and a plurality of optical sheets 160 to enhance the brightness.

The lamp unit 130 is provided in a lateral side of the light guide plate 120, and the light emitted from the lamp unit 130 enters the light guide plate 120 through the lateral side of the light guide plate 120. Further, a lamp reflector 140 is provided in the lateral side of the light guide plate 120, covering the lamp unit 130. The lamp reflector 140 reflects the light arriving at the lamp reflector 140 into the light guide plate 120, thereby decreasing light loss. Here, a CCFL (cold cathode fluorescent lamp) is generally used as the lamp unit 130.

The light guide plate 120 guides the light from the lamp unit 130 toward the LCD panel 110 uniformly. On the rear surface of the light guide plate 120 is formed a fine pattern such as a dotted pattern, etc., thereby reflecting the light toward the LCD panel 110.

Behind the light guide plate 120 is generally placed a reflector 150 to reflect the light arriving at the reflector 150 into the light guide plate 120, thereby decreasing the light loss.

The plurality of optical sheets 160 is placed between the light guide plate 120 and the LCD panel 110, to thereby decrease a bright-line and enhance the brightness. The optical sheets 160 generally include a diffusing sheet 161, a first prism sheet 162, a second prism sheet 163, etc.

The diffusing sheet 161 diffuses the light guided by the light guide plate 120, thereby uniformly transmitting the light to the LCD panel 110 without uneven brightness.

The first prism sheet 162 and the second prism sheet 163 are sequentially placed in front of the diffusing sheet 161 and are respectively formed with a plurality of prism teeth 162a and 163a at intervals of a predetermined pitch. The first and second prism sheets 162 and 163 condense the light diffused by the diffusing sheet 161 onto the LCD panel 110, thereby enhancing the brightness. Here, the prism teeth 162a of the first prism 162 are perpendicularly to the prism teeth 163a of the second prism 163, thereby condensing the light lengthwise and crosswise. Generally, the first and second prism sheets 162 and 163 are respectively manufactured by coating base layers 162b and 163b made of PET (polyethylene terephthalate) with acrylic resin and then forming the prism teeth 162a and 163a on the acrylic resin.

On the other hand, in the conventional LCD apparatus, a reflective polarizing film (DBEF: dual brightness enhancement film) 164 can be added between the second prism sheet 163 and the LCD panel 110 in order to more enhance the brightness. The reflective polarizing film 164 allows the light from the light guide plate 120 to be repeatedly reflected and transmitted, thereby enhancing the brightness. For example, P-wave components of the light from the lamp unit 130 are transmitted through the reflective polarizing film 164 to the LCD panel 110, and S-wave components thereof are reflected from the reflective polarizing film 164 toward the light guide plate 120. Here, the S-wave components of the light reflected from the reflective polarizing film 164 are reflected again from the diffusing sheet 161, the light guide plate 120 or the reflector 150. On this way, the reflected S-wave components are changed into the P-wave components and then transmitted through the reflective polarizing film 164, thereby decreasing the light loss.

However, the conventional LCD apparatus has following problems.

First, because the prism sheet 162 and 163 is manufactured by coating only one surface of the base layer 162b and 163b made of the PET with acrylic resin, the prism sheet 162 and 163 can be easily shrunk, and moire pattern can easily occur by interference between the prism sheet 162 and 163 and the LCD panel 110.

Second, the prism sheet 162 and 163 causes the bright-line at the lateral sides, through which light enters, of the light guide plate 120. Particularly, if the LCD apparatus has a reverse prism sheet structure, the bright-line can all the more occur at the lateral sides of the light guide plate 120.

Third, the reflective polarizing film 164 enhances the brightness, but is relatively expensive, thereby increasing production cost of the LCD apparatus.

SUMMARY OF THE INVENTION

Accordingly, it is an aspect of the present invention to provide an optical sheet and an LCD apparatus using the same, in which a bright-line is decreased, brightness are enhanced, and the optical sheet is prevented from shrinking.

Additional aspects and advantages of the invention will be set forth in part in the description which follows and, in part, will be obvious form the description, or may be learned by practice of the invention.

The foregoing and other aspects of the present invention are achieved by providing an optical sheet used in an LCD apparatus, comprising a reflective polarizing layer selectively transmitting and reflecting light, and a condensing layer attached to one surface of the reflective polarizing layer and condensing the light.

According to an aspect of the invention, the condensing layer is achieved by a plurality of prism teeth parallel arranged at intervals of a predetermined pitch.

According to an aspect of the invention, the optical sheet further comprising a first reinforcing layer attached to the other surface of the reflective polarizing layer and preventing the optical sheet from shrinking.

According to an aspect of the invention, the optical sheet further comprising a second reinforcing layer provided between the reflective polarizing layer and preventing the optical sheet from shrinking.

According to an aspect of the invention, on the surface of the first reinforcing layer is provided a diffusing part to diffuse the light.

According to an aspect of the invention, the diffusing part allows the light passed through the first reinforcing layer to have a haze value of at least 30%.

According to an aspect of the invention, on the surface of the reflective polarizing layer is provided a diffusing part to diffuse the light.

According to an aspect of the invention, the diffusing part allows the light passed through the reflective polarizing layer to have a haze value of at least 30%.

According to another aspect of the present invention, the above and other aspects may be also achieved by providing an LCD apparatus comprising an LCD panel to display a picture thereon, a lamp unit emitting light, a light guide plate to guide the light from the lamp unit toward the LCD panel evenly, further comprising an optical sheet provided between the LCD panel and the light guide plate and including a condensing layer condensing the light from the light guide plate on the LCD panel, and a reflective polarizing layer attached to the surface of the condensing layer facing the LCD panel and selectively transmitting and reflecting the light condensed by the condensing layer.

According to an aspect of the invention, the condensing layer of the optical sheet is achieved by a plurality of prism teeth parallel arranged at intervals of a predetermined pitch.

According to an aspect of the invention, the optical sheet further comprising a first reinforcing layer attached to the surface of the reflective polarizing layer facing the LCD panel, and preventing the optical sheet from shrinking.

According to an aspect of the invention, the optical sheet further comprising a second reinforcing layer provided between the reflective polarizing layer and preventing the optical sheet from shrinking.

According to an aspect of the invention, the optical sheet further comprising a reinforcing layer provided between the reflective polarizing layer and the condensing layer and preventing the optical sheet from shrinking.

According to an aspect of the invention, the optical sheet is attached to the surface of the LCD panel facing the light guide plate.

According to an aspect of the invention, on the surface of the optical sheet facing the LCD panel is provided a diffusing part to diffusing the light.

According to an aspect of the invention, the diffusing part of the optical sheet allows the light passed through the optical sheet to have a haze value of at least 30%.

According to an aspect of the invention, the prism teeth of the optical sheet are formed along a transmitting axis direction of the reflective polarizing layer.

According to an aspect of the invention, on the opposite surface of the light guide plate facing the LCD panel is provided a plurality of prism teeth parallel arranged at intervals of a predetermined pitch, and the prism teeth of the light guide plate are perpendicular to the prism teeth of the optical sheet.

BRIEF DESCRIPTION OF THE DRAWINGS

These and other aspects and advantages of the present invention will become apparent and more readily appreciated from the following description of the embodiments, taken in conjunction with the accompany drawings of which:

FIG. 9 is a sectional view of an LCD apparatus according to a second embodiment of the present invention using the optical sheet of FIG. 2;

DETAILED DESCRIPTION OF THE PREFERRED EMBODIMENT

Figure 1:
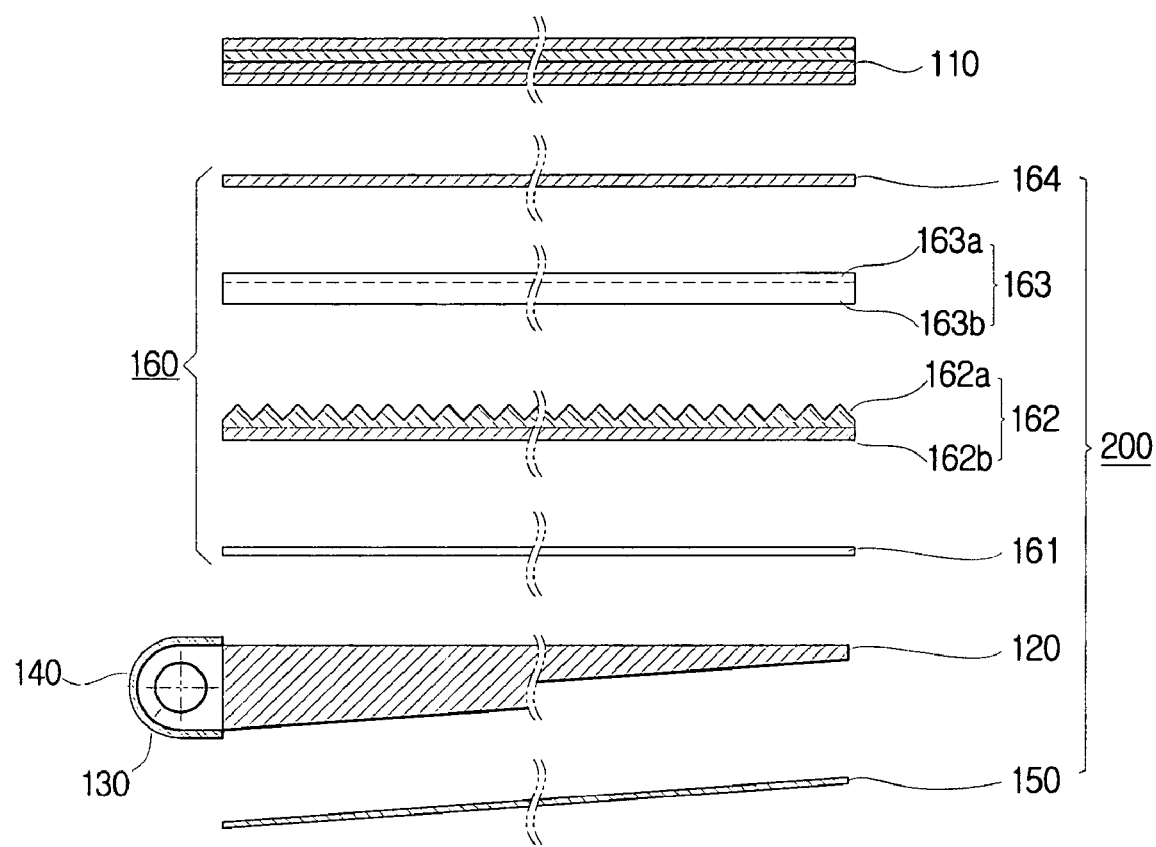
FIG. 1 is a sectional view of a conventional LCD apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
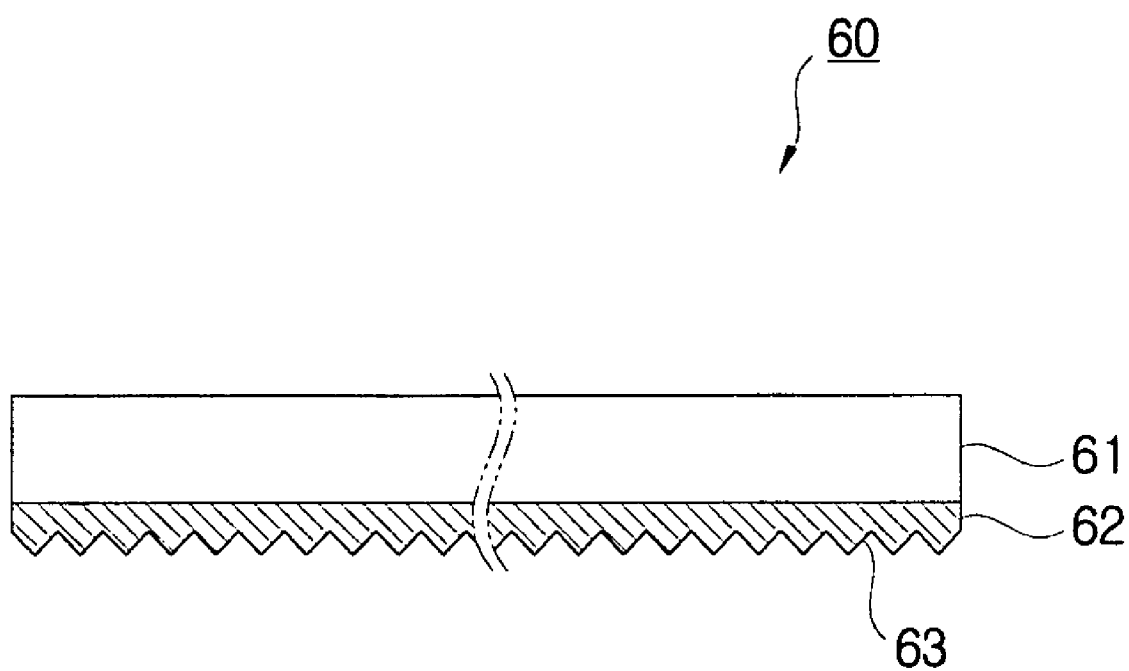
FIGS. 2 through 7 are sectional views of an optical sheet according to several embodiments of the present invention.

As shown in FIG. 2, an optical sheet 60 according to a first embodiment of the present invention comprises a reflective polarizing layer 61 selectively transmitting and reflecting light, and a condensing layer 62 attached to one surface of the reflective polarizing layer 61 and condensing the light.

The reflective polarizing layer 61 selectively transmits and reflects the light. The reflective polarizing layer 61 is formed by layering films which have the same refractive index of an X-axis and are different in a refractive index of a Y-axis; therefore, X-axis vibrating components of the light can be transmitted through the X-axis, but the other components including Y-axis vibrating components are reflected. For example, P-wave components of the light from the lamp unit 130 are transmitted through the reflective polarizing layer 61, and S-wave components thereof are reflected from the reflective polarizing layer 61.

The condensing layer 62 is attached to the one surface of the reflective polarizing layer 61 and condenses the light. The condensing layer 62 is achieved by coating the one surface of the reflective polarizing layer 61 with acrylic resin and then forming a plurality of prism teeth 63 on the acrylic resin, wherein the prism teeth 63 are parallel arranged at intervals of a predetermined pitch. The prism teeth 63 formed on the condensing layer 62 are employed for condensing the incident light toward the reflective polarizing layer 61. In this embodiment, the prism teeth 63 have a triangular cross section. However, the prism teeth may have a polygonal cross section, or an edge of the prism teeth 63 may be rounded off. Further, it is preferable that the pitch between the prism teeth is 20 μm~100 μm and an inclination angle of the prism tooth is 60°~70°.

Figure 3:
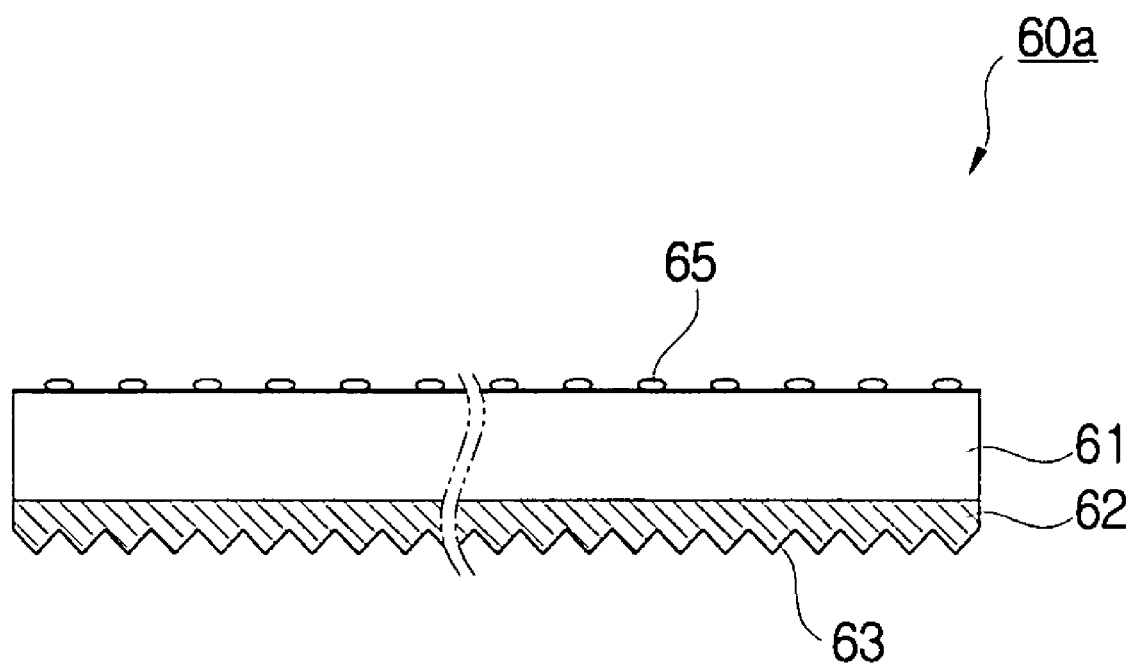

FIG. 3 is a sectional view of an optical sheet according to a second embodiment of the present invention. As shown therein, an optical sheet 60a according to the second embodiment comprises a reflective polarizing layer 61 selectively transmitting and reflecting light, a condensing layer 62 attached to one surface of the reflective polarizing layer 61 and condensing the light, and a diffusing part 65 provided on the other surface of the reflective polarizing layer 61 and diffusing the light. Here, the reflective polarizing layer 61 and the condensing layer 62 according to the second embodiment are the same as those according to the first embodiment, and repetitive descriptions thereof will be avoided.

The diffusing part 65 is achieved by a plurality of beads (refer to FIG. 3) capable of diffusing the light. However, the diffusing part 65 may be achieved by a prominence and depression pattern. Here, it is preferable that the diffusing part 65 allows the light passed through the reflective polarizing layer 61 to have a haze value of at least 30%. Thus, the optical sheet 60a can prevent moire and rainbow patterns due to the condensing layer 62 from occurring in the LCD apparatus.

Figure 4:
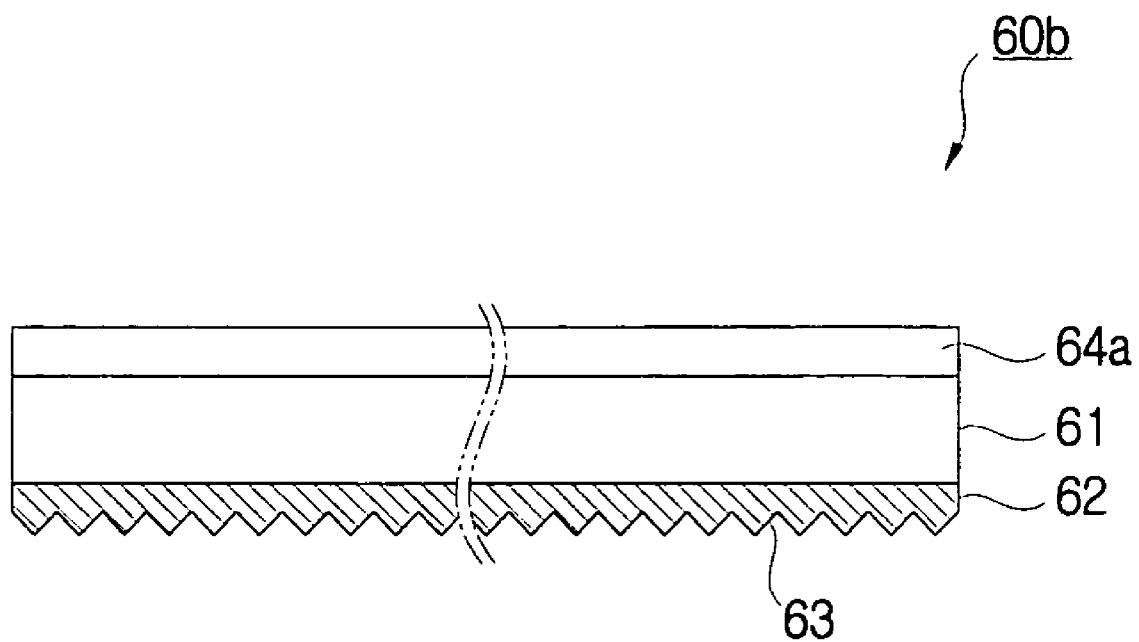

FIG. 4 is a sectional view of an optical sheet according to a third embodiment of the present invention. As shown therein, an optical sheet 60b according to the third embodiment comprises a reflective polarizing layer 61 selectively transmitting and reflecting light, a condensing layer 62 attached to one surface of the reflective polarizing layer 61 and condensing the light, and a first reinforcing layer 64a attached to the other surface of the reflective polarizing layer 61 and preventing the optical sheet 60b from shrinking. Here, the reflective polarizing layer 61 and the condensing layer 62 according to the third embodiment are the same as those according to the first embodiment, and repetitive descriptions thereof will be avoided.

The first reinforcing layer 64a is achieved by coating the other surface of the reflective polarizing layer 61 with polycarbonate resin. The first reinforcing layer 64a is employed in preventing the optical sheet 60b from a shrink due to the condensing layer 62 attached to only one surface of the reflective polarizing layer 61.

Figure 5:
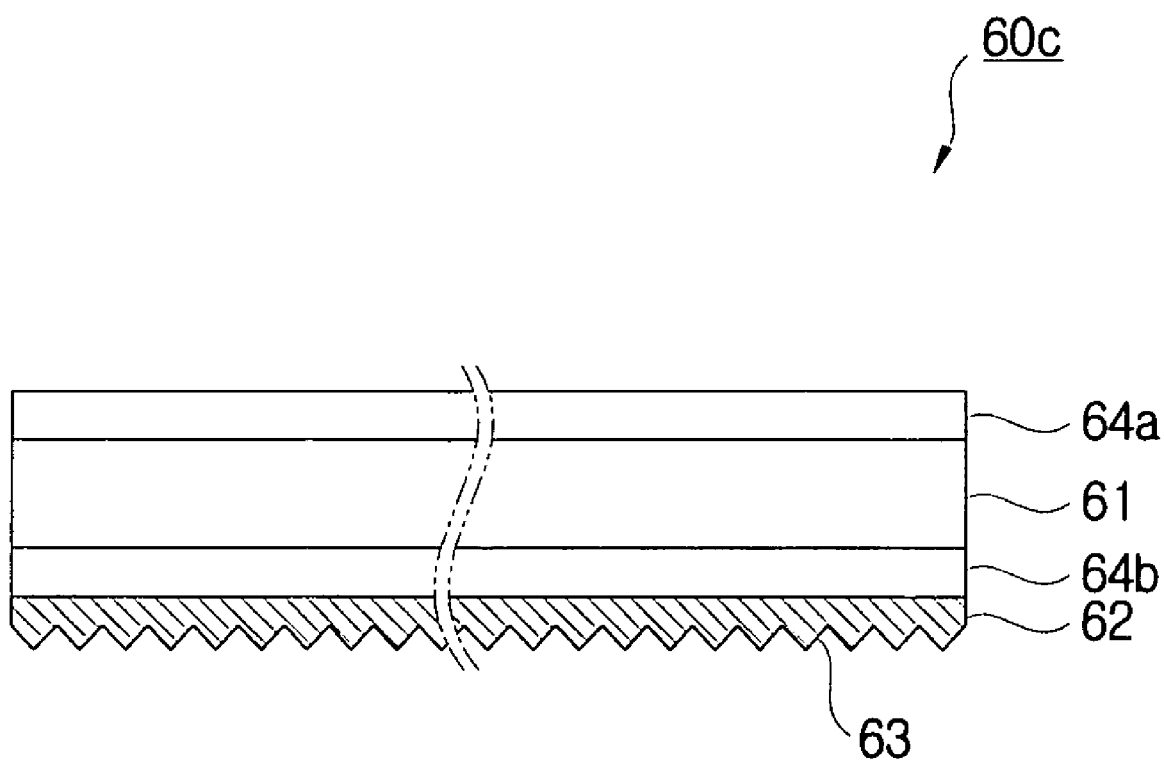

FIG. 5 is a sectional view of an optical sheet according to a fourth embodiment of the present invention. As shown therein, an optical sheet 60c according to the fourth embodiment comprises a reflective polarizing layer 61 selectively transmitting and reflecting light, a first reinforcing layer 64a attached to one surface of the reflective polarizing layer 61 and preventing the optical sheet 60c from shrinking, a second reinforcing layer 64b attached to the other surface of the reflective polarizing layer 61 and preventing the optical sheet 60c from shrinking, and a condensing layer 62 attached to the second reinforcing layer 64b and condensing the light. Here, the reflective polarizing layer 61, the condensing layer 62, and the first reinforcing layer 64a according to the fourth embodiment are the same as those according to the third embodiment, and repetitive descriptions thereof will be avoided.

The second reinforcing layer 64b is provided between the reflective polarizing layer 61 and the condensing layer 62, so that the whole thickness of the optical sheet 60c is increased, thereby preventing the optical sheet 60b from shrinking. Like the first reinforcing layer 64a, the second reinforcing layer 64b is made of the polycarbonate resin.

Figure 6:
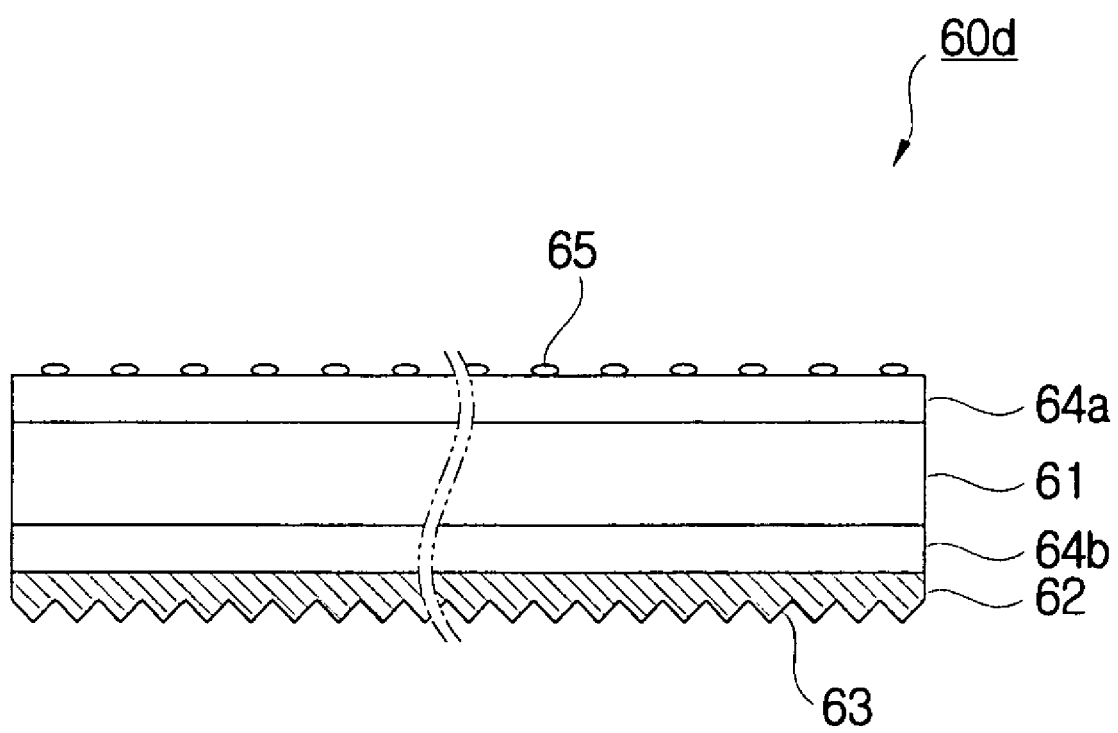

On the other hand, a diffusing part 65 can be provided on an outer surface of the first reinforcing layer 64a of each optical sheet 60b and 60c according to the third and fourth embodiments in order to diffuse the light. That is illustrated in FIG. 6 as an optical sheet 60d according to a fifth embodiment of the present invention. In the optical sheet 60d of FIG. 6, a plurality of beads is exemplarily formed as the diffusing part 65 on the outer surface of the first reinforcing layer 64a. Here, it is preferable that the diffusing part of the optical sheet allows the light passed through the first reinforcing layer 64a to have a haze value of at least 30%. Thus, the optical sheet 60d can prevent moire and rainbow patterns due to the condensing layer 62 from occurring in the LCD apparatus.

Figure 7:
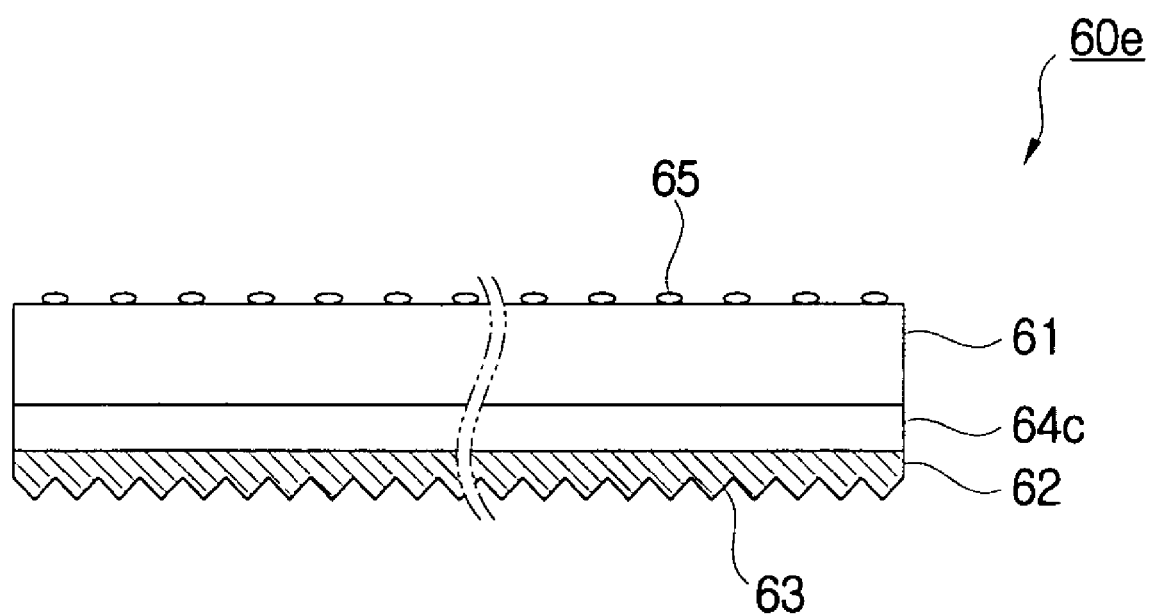

FIG. 7 is a sectional view of an optical sheet according to a sixth embodiment of the present invention. As shown therein, an optical sheet 60e according to the sixth embodiment comprises a reflective polarizing layer 61 selectively transmitting and reflecting light, a reinforcing layer 64c attached to one surface of the reflective polarizing layer 61 and preventing the optical sheet 60e from shrinking, and a condensing layer 62 attached to the reinforcing layer 64c and condensing the light. Here, the reflective polarizing layer 61 and the condensing layer 62 according to the sixth embodiment are the same as those according to the first embodiment, and repetitive descriptions thereof will be avoided.

The reinforcing layer 64c is provided between the reflective polarizing layer 61 and the condensing layer 62, so that the whole thickness of the optical sheet 60e is increased, thereby preventing the optical sheet 60e from shrinking.

Further, in the optical sheet 60e according to the sixth embodiment, a diffusing part 65 is formed on the outer surface of the reflective polarizing layer 61. Therefore, the optical sheet 60e can prevent moire and rainbow patterns due to the condensing layer 62 from occurring in the LCD apparatus.

Figure 8:
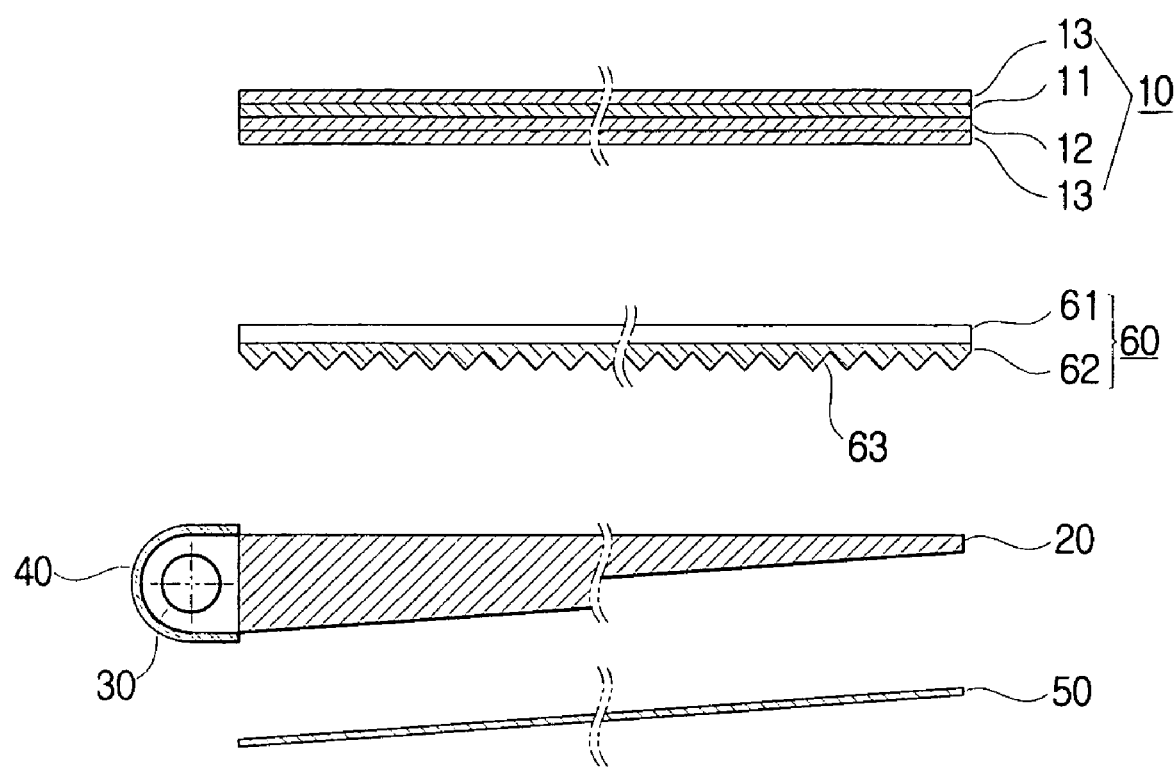
FIG. 8 is a sectional view of an LCD apparatus according to a first embodiment of the present invention using the optical sheet of FIG. 2.

Hereinbelow, an LCD apparatus according to a first embodiment of the present invention using the above-described optical sheets will be described with reference to FIG. 8, wherein the optical sheet 60 according to the first embodiment is exemplarily used.

An LCD apparatus according to the first embodiment comprises an LCD panel 10 to display images thereon, a lamp unit 30 emitting light, a light guide plate 20 to guide the light from the lamp unit 30 toward the LCD panel 10 evenly, and a reflector 50 provided behind the light guide plate 20 and reflecting the light arriving at the reflector 60 into the light guide plate 20. Further, the LCD apparatus according to the first embodiment comprises the optical sheet 60; the optical sheet 60 is provided between the LCD panel 10 and the light guide plate 20 and includes the condensing layer 62 condensing the light from the light guide plate 20 on the LCD panel 10, and the reflective polarizing layer 61 attached to the surface of the condensing layer 62 facing the LCD panel 10 and selectively transmitting and reflecting the light condensed by the condensing layer 62.

The LCD panel 10 includes a TFT (thin film transistor) array substrate 12 formed with switching elements and pixel electrodes, a color filter substrate 11, and a liquid crystal (not shown) filled between the TFT array substrate 12 and the color filter substrate 11. An electric signal including image data is transmitted to transistors of the TFT array substrate 12 via a source PCB (printed circuit board) and a gate PCB; the liquid crystal displays the images with the light transmitted through the light guide plate 20 while the electric current passes through the liquid crystal. Further, on the outer surfaces of the color filter substrate 11 and the TFT array substrate 12 are respectively provided polarizing plates 13 to selectively reflect and absorb the light, thereby enhancing the brightness of the LCD apparatus.

The lamp unit 30 is provided in a lateral side of the light guide plate 20 and emits the light toward the light guide plate 20. Here, the lamp unit 30 includes a CCFL (cold cathode fluorescent lamp), an EL (electro luminescence), an LED (light emitting diode), etc.

Further, a lamp reflector 40 is provided in the lateral side of the light guide plate 20, covering the lamp Unit 30. The lamp reflector 40 reflects the light arriving at the lamp reflector 40 into the light guide plate 20, thereby decreasing light loss.

The Light guide plate 20 is made of a transparent plastic material such as an acryl, etc., and guides the light from the lamp unit 30 toward the LCD panel 10 uniformly. On the rear surface of the light guide plate 20 is formed a fine pattern such as a dotted pattern, etc. to reflect the light emitted from the lamp unit 30 toward the LCD panel 10. Further, on the rear surface of the light guide plate 20 is formed a plurality of prism teeth (not shown) parallel arranged at intervals of a predetermined pitch. The prism teeth are employed in condensing the light toward the LCD panel 10.

The optical sheet 60 of the first embodiment is provided between the LCD panel 10 and the light guide plate 20. In the optical sheet 60, the reflective polarizing layer 61 faces the LCD panel 10, and the condensing layer 62 faces the light guide plate 20. Further, the prism teeth 63 of the condensing layer 62 and the prism teeth of the light guide plate 20 cross each other. Thus, the light transmitted from the light guide plate 20 toward the LCD panel 10 is condensed by the condensing layer 20, and then the condensed light is partially reflected and partially transmitted by the reflective polarizing layer 61.

The reflective polarizing layer 61 is formed by layering films which have the same refractive index of an X-axis and are different in a refractive index of a Y-axis; therefore, the light can be transmitted through the X-axis of which the refractive index is the same to every film, but cannot be transmitted through the Y-axis of which the refractive index is different according to every film. That is, X-axis vibrating components of the light condensed by the condensing layer 62 pass through the reflective polarizing layer 61, but the other components including Y-axis vibrating components are reflected from the reflective polarizing layer 61. For example, P-wave components, vibrating in parallel with the X-axis, of the light from the light guide plate 20 are transmitted through the reflective polarizing layer 61, and S-wave components, vibrating in parallel with the Y-axis, thereof are reflected from the reflective polarizing film 61. Here, the S-wave components of the light reflected from the reflective polarizing layer 61 are reflected again from the light guide plate 20 or the reflector 50 toward the LCD panel 10. On this way, the reflected S-wave components are changed into the P-wave components and then pass through the reflective polarizing layer 61, thereby minimizing the light loss. Herein, the X-axis, as a transmitting axis, of the reflective polarizing layer 61 is inclined by about 45° degrees relative to a lengthwise direction of the optical sheet 60.

On the other hand, FIG. 9 shows an LCD apparatus according to a second embodiment of the present invention using the above-described optical sheets. Hereinbelow, the LCD apparatus will be described with reference to FIG. 9, wherein the optical sheet 60 according to the first embodiment is exemplarily used, and repetitive descriptions thereof will be avoided as necessary.

The LCD apparatus according to the second embodiment comprises an LCD panel 10 to display images thereon, a lamp unit 30 emitting light, a light guide plate 20 to guide the light from the lamp unit 30 toward the LCD panel 10 evenly, and a reflector 60 provided behind the light guide plate 20 and reflecting the light arriving at the reflector 60 into the light guide plate 20. Further, the LCD apparatus according to the second embodiment comprises the optical sheet 60; the optical sheet 60 is attached to the LCD panel 10 and includes the condensing layer 62 condensing the light from the light guide plate 20, and the reflective polarizing layer 61 selectively transmitting and reflecting the light condensed by the condensing layer 62.

The LCD panel 10 includes a TFT array substrate 12, a color filter substrate 11, and a liquid crystal (now shown) filled between the TFT array substrate 12 and the color filter substrate 11. Further, on the outer surfaces of the color filter substrate 11 and the TFT array substrate 12 are respectively provided polarizing plates 13 to selectively reflect and absorb the light. In this embodiment, the optical sheet 60 is attached to the surface of the polarizing plate 13 provided on the outer surface of the TFT array substrate 12, that is, the optical sheet 60 and the LCD panel 10 are formed as a single body. Further, the transmitting axis of the polarizing plate 13 provided on the surface of the TFT array substrate is preferably aligned with the transmitting axis of the optical sheet 60 in order to decrease light loss and enhance the brightness. For example, if the optical sheet 60 passes the P-wave components therethrough and reflects the S-wave components therefrom, the polarizing plate 13 provided on the surface of the TFT array substrate passes the P-wave components therethrough and absorbs the S-wave components.

Figure 10:
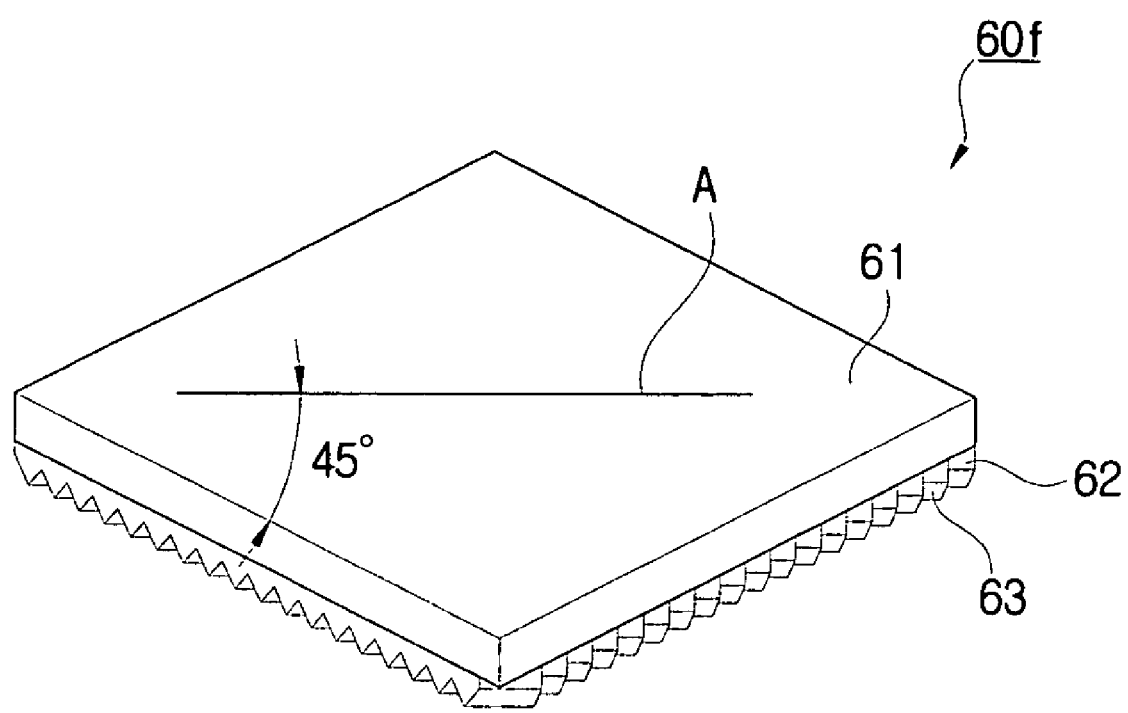
FIG. 10 illustrates a transmitting axis of a reflective polarizing layer and prism teeth of a condensing layer in the optical sheet according to the present invention.

In the above-described embodiment, the prism teeth 64 of the condensing layer 62 are formed along the lengthwise direction of the optical sheet 60. However, the prism teeth of the condensing layer may be formed along the transmitting axis direction of the reflective polarizing layer. For example, as shown in FIG. 10, in the case where the transmitting axis "A" of the reflective polarizing layer 61 is inclined by about 45° degrees relative to a lengthwise direction of the optical sheet 60f, the prism teeth 64 of the condensing layer 62 are inclined by about 45° degrees relative to a lengthwise direction of the optical sheet 60f. In this LCD apparatus, the transmitting axis of the polarizing plate provided on the rear surface of the TFT array substrate of the LCD panel is aligned with the transmitting axis of the reflective polarizing layer 61, and the prism teeth of the light guide plate may be perpendicular to the prism teeth 63 of the condensing layer 62. Thus, moire and rainbow patterns occurring in the LCD apparatus are decreased.

In the foregoing embodiment, it was described that the optical sheet 60 according to the first embodiment is used in the LCD apparatus according to the present invention. However, the optical sheet according to the second through sixth embodiments may be used in the LCD apparatus according to the present invention.

Preferably, the reinforcing layers of the optical sheets according to the foregoing embodiments are made of a material such as polycarbonate resin, which does not polarize the light, so that the brightness is enhanced and the light loss is decreased.

As described above, there is provided an optical sheet comprising a reflective polarizing layer selectively reflecting and transmitting light, and a condensing layer attached to one surface of the reflective polarizing layer and condensing the light, so that brightness are enhanced, and the optical sheet is prevented from shrinking. Further, there is no need of a base layer made of the PET and used in the conventional prism sheet, so that production cost is decreased.

As described above, the present invention provides an optical sheet and an LCD apparatus using the same, in which a bright-line is decreased, brightness are enhanced, and the optical sheet is prevented from shrinking.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical sheet used in an LCD apparatus, comprising:
   a reflective polarizing layer selectively tranamitting and reflecting light; and
   a condensing layer attached to one surface of the reflective polarizing layer and condensing the light;
   a first reinforcing layer attached to the other surface of the reflective polarizing layer and preventing the optical sheet from shrinking; and
   a diffusing part provided on the surface of the first reinforcing layer and diffusing the light, the diffusing part comprising a plurality of beads;
   wherein the condensing layer is achieved by a plurality of prism teeth arranged in parallel at intervals of a predetermined pitch; and the diffusing part allows the light passed through the first reinforcing layer to have a haze value of at least 30%.

2. The optical sheet according to claim 1, wherein further comprising a second reinforcing layer provided between the reflective polarizing layer and the condensing layer and preventing the optical sheet from shrinking.

3. The optical sheet according to claim 1, wherein the diffusing part allows the light passed through the reflective polarizing layer to have a haze value of at least 30%.

4. An LCD apparatus comprising an LCD panel to display a picture thereon, a lamp unit emitting light, a light guide plate to guide the light from the lamp unit toward the LCD panel evenly, the LCD comprising:
   an optical sheet provided between the LCD panel and the light guide plate, the optical sheet comprising:
   a reflective polarizing layer selectively transmitting and reflecting the light;
   a condensing layer attached to one surface of the reflective polarizing layer and condensing the light;
   a first reinforcing layer attached to the other surface of the reflective polarizing layer and preventing the optical sheet from shrinking; and
   a diffusing part provided on the surface of the first reinforcing layer and diffusing the light, the diffusing part comprising a plurality of beads;
   wherein the condensing layer is achieved by a plurality of prism teeth arranged in parallel at intervals of a predetermined pitch; and the diffusing part allows the light passed through the first reinforcing layer to have a haze value of at least 30%.

5. The LCD apparatus according to claim 4, further comprising a second reinforcing layer provided between the reflective polarizing layer and the condensing layer and preventing the optical sheet from shrinking.

6. The LCD apparatus according to claim 4, wherein the prism teeth of the optical sheet are formed along a transmitting axis direction of the reflective polarizing layer.

* * * * *